UNITED STATES PATENT OFFICE.

LÉON FRANÇOIS MASCART, OF PARIS, FRANCE, ASSIGNOR TO SOCIÉTÉ DU VERRE TRIPLEX, OF PARIS, FRANCE.

REINFORCED GLASS AND PROCESS OF MAKING THE SAME.

1,342,267.     Specification of Letters Patent.     Patented June 1, 1920.

No Drawing.     Application filed March 21, 1914. Serial No. 826,411.

*To all whom it may concern:*

Be it known that I, LÉON FRANÇOIS MASCART, a citizen of the Republic of France, and a resident of 17 Rue Desnouettes, Paris, France, have invented a new and useful Improved Reinforced Glass and Process of Making the Same, of which the following is a specification.

In the manufacture of non-scatterable glass strengthened or reinforced by means of a core of celluloid or other similar material glued to the sheets of glass by gelatin, it is of great importance for effecting the gluing to be able to use naturally hard gelatin or gelatins artificially hardened or tanned or rendered sufficiently insoluble to resist the destructive action of the moisture of the air and able to withstand a large increase of temperature without having a tendency to melt or run.

This invention relates to improvements, the object of which is the employment of gelatin in this capacity and in addition to insure a perfect adhesion of any gelatin (whatever be its nature and state) not only to the surface of the sheets of glass, which does not offer any serious difficulties when the gelatin is spread on the glass, but also to the surface of celluloid, cellulose acetate or other cellulose ester or suitable substance intended for use as the core of the reinforced glass.

As hereinafter described adhesion to the glass is obtained in a very simple manner by spreading a layer of an aqueous solution of gelatin on each of the glass sheets (which have been previously properly cleaned) with the use of any product generally employed for the purpose, and then allowing the sheets to dry. The layer of gelatin thus obtained, can be hardened, tanned or rendered insoluble by the well-known processes (bichromate of potash, formalin, etc.). The chief difficulty met with which is overcome by the present invention, consists in insuring sufficient adhesion of the said layer of hard gelatin which has been rendered insoluble to the celluloid or other cellulose ester intended to form the core of the reinforced glass.

Accordingly one of the essential improvements forming the subject of the present invention, consists in depositing from its solution a thin layer of cellulose on the gelatin in such condition as to insure its adhesion to the latter to the required degree whatever be its state of hardness, and in using the aforesaid layer of cellulose as an intermediate substance for insuring the adhesion to the gelatin of the remainder of the celluloid core; this no longer offers any difficulty, as it is then merely a question of making celluloid adhere to celluloid.

In order to carry out the invention on the top of each layer of gelatin a solution of nitro-cellulose celluloid or other ester of cellulose (acetate of cellulose) is uniformly spread and allowed to dry. The layer of cellulose thus obtained, strongly adheres to the gelatin, more particularly if a solvent has been used which is not very volatile, such as amyl acetate, but in order to insure satisfactory adhesion in every case, whatever be the state and the nature of the gelatin, it is necessary to add to the solution of the cellulose ester a small proportion (about 10—20%) of various substances which have the property of being common solvents for gelatin and for the cellulose ester, such for instance as acetic acid, acetamid or formamid.

For completing the manufacture of the reinforced glass two glass sheets which have been prepared, as described above, are dipped into alcohol of strength about 90% and after being exposed to a temperature of about 60–70° C. are pressed one against the other, or before pressing the sheets together there may be inserted between them a sheet of celluloid or some other ester of cellulose.

Although the process just described seems to be the best for insuring a perfect adhesion of gelatin to celluloid, experience has shown that very satisfactory results can be obtained even with hard gelatin or gelatin which has been hardened or rendered insoluble by dipping sheets of glass previously covered with gelatin by spreading as already mentioned, directly into alcohol of about 90% strength mixed with one or more common solvents for gelatin and celluloid or esters of cellulose (acetic acid, acetamid, formamid, etc.), for instance, for dissolving an ester of cellulose in the proportions indicated of about 10–20%. This direct dipping into alcohol prepared in this way takes the place of the spreading of the said alcohol solution; it is then sufficient to press the sheets of glass against a core of celluloid or other cellulose ester inserted between them, the temperature conditions above referred to being observed.

Another improvement which contributes to the increased adhesive power of a celluloid sheet to gelatin consists in mechanically or chemically treating the surface of the celluloid sheet. In the first case, the surface is slightly roughened, for instance by means of a sand blast. In the second case, a reducing reagent, for instance an alkaline sulfid or any of the reagents proposed for denitrating nitro-cellulose, is used. The sheet of cellulose thus mechanically or chemically prepared strongly adheres to a sheet of gelatin when the two sheets are dipped into alcohol and pressed against one another, at the same time being exposed to the action of heat. This feature of mechanically or chemically treating the celluloid sheet forms the subject of a divisional application for patent filed by me September 12, 1918, Serial No. 253,790.

If instead of using nitro-cellulose or celluloid, sheets of a mixture of celluloid and cellulose acetate, such as are industrially prepared are used, the same process remains applicable. Sheets of cellulose acetate or other similar esters which do not contain nitro-cellulose, have their surface attacked by a hot alkaline solution and can subsequently be treated in the same manner.

A modification of the process is as follows:

After the surface of the sheet of cellulose ester has been attacked it is dipped into a hot solution of gelatin and left to dry. The sheet which is thus coated with gelatin on both sides, is after drying dipped into alcohol and pressed between two sheets of glass or two sheets of glass coated with gelatin, under the action of heat, as stated above.

In all the cases reinforced glass, comprising two sheets of glass and a celluloid core stuck to the glass by means of two layers of gelatin is obtained; this product however has the peculiarity of perfect adherence of the various portions to one another, even when the layers of gelatin and celluloid deposited from solution, are exceedingly thin, (for instance 0.001 mm.).

In the same way there could be manufactured reinforced glass comprising any desired number of glass plates, both greater and less than two.

More particularly, when it is desired to manufacture a product consisting of a single sheet of glass, to which is glued, by means of gelatin, a sheet of celluloid, it is sufficient to stop the operation at the moment when the cellulose layer has been spread on the layer of gelatin. If it is considered that this layer is not sufficiently thick, then one or more layers obtained in the same manner could be superposed on it.

Glass prepared in this manner has a solidity which makes it a real reinforced glass, suitable for certain applications. If the gelatin has been suitably hardened and rendered insoluble, it resists the action of water and heat, and can be used just as it is. The layer of cellulose must not be too thin; it must be at least 0.1-0.2 mm. thick in order to form a sufficiently strong core. Finally, as this core is exposed, it is very important that it should be incombustible. It is therefore advisable, more particularly in this special case, to make it of cellulose acetate.

What I claim and desire to secure by Letters Patent of the United States is:

1. The process of reinforcing glass which comprises the step of forming a film of gelatin upon the face of a sheet of glass from a gelatin solution, permitting said film to dry, and then superposing on said film a film of cellulose ester in the form of a solution, the solvent employed being common to both the gelatin and the cellulose ester, whereby an intimate union between the films is secured.

2. The process of reinforcing glass which comprises the step of forming a film of gelatin upon the face of a sheet of glass from a gelatin solution, permitting said film to dry, and then superposing on said film a film of cellulose ester in the form of a solution, the solvent employed being common to both the gelatin and the cellulose ester, whereby an intimate union between the films is secured, permitting said films to dry and then pressing a relatively strong sheet of cellulose ester against the same in the presence of heat, for the purpose described.

3. The process of reinforcing glass which comprises the step of forming a film of gelatin upon the face of a sheet of glass from a gelatin solution, permitting said film to dry, and then superposing on said film a film of cellulose ester in the form of a solution, the solvent employed being common to both the gelatin and the cellulose ester, whereby an intimate union between the films is secured, permitting said films to dry and then pressing a relatively strong sheet of cellulose ester against the same in the presence of heat and alcohol, for the purpose described.

4. The process of reinforcing glass which comprises the step of forming a film of gelatin upon the face of a sheet of glass from a gelatin solution, permitting said film to dry, and then superposing on said film a film of cellulose ester in the form of a solution, the solvent employed being common to both the gelatin and the cellulose ester, whereby an intimate union between the films is secured, permitting said films to dry and then pressing a relatively strong sheet of cellulose ester against the same in the presence of heat, the adherent surface of the said sheet having been previously treated to more readily unite with said films under the pressure exerted.

5. The process of reinforcing glass which comprises the step of uniting thereon a layer of gelatin and a layer of cellulose ester, said union being accomplished in the presence of a solvent common to said gelatin and cellulose.

6. As a new article of manufacture, a sheet of cellulose ester faced on both sides and in the order named by a film of cellulose ester, a film of gelatin united thereto in the presence of a common solvent, and a sheet of glass, all rigidly and autogeneously united together.

7. The process of making non-scatterable glass which comprises applying to a sheet of glass successively a solution of gelatin and a solution of cellulose material, at least one of said solutions containing a solvent which has a solvent action upon both the gelatin and the cellulose material.

8. The process of making non-scatterable glass which comprises coating sheets of glass with gelatin, then applying to such coating a solution of cellulosic material and thereafter pressing a sheet of celluloid between the coated faces of two such glass sheets.

9. The process of making non-scatterable glass which comprises coating glass sheets with hard gelatin, applying to each such coating a layer of cellulose material in the presence of a solvent of both the gelatin and cellulose material, and thereafter pressing between two such coated glass sheets a sheet of celluloid.

10. The process of making non-scatterable glass, which comprises applying a layer of gelatin to a glass sheet, coating such layer with a solution of cellulosic material and allowing same to dry, and then pressing between two such coated glass sheets a sheet of celluloid, after treating the sheets with alcohol.

11. The process of making non-scatterable glass which comprises applying to a sheet of glass a gelatin coating and applying to said gelatin coating a coating of cellulose material, there being present in the region of contact of the two coatings a solvent for both.

12. The process of making non-scatterable glass, which comprises coating a sheet of glass with hard gelatin, and then applying to said gelatin layer a coating of cellulose material, there being present in the region of contact of the two coatings a solvent for both.

13. A non-scatterable glass comprising a sheet of glass, a film of gelatin thereon and a film of cellulose material on said gelatin film, the two films being interlocked in the region of their contact by a solvent common to both films.

14. A non-scatterable glass comprising a sheet of glass, a film of gelatin thereon, a film of cellulose material on said gelatin film, the two films being interlocked by having been dissolved into each other at the region of contact by a common solvent, and a protective material covering said film of cellulose material.

15. As a new article of manufacture, reinforced glass, comprising a sheet of cellulosic material, faced on each side by layers of said material and gelatinous material and a sheet of glass all firmly adhered together.

In testimony whereof I sign my name to this specification in the presence of two subscribing witnesses.

LÉON FRANÇOIS MASCART.

Witnesses:
   CHAS. P. PRESSLY,
   LEON TEILLET.